US011311979B2

(12) United States Patent
Nam et al.

(10) Patent No.: US 11,311,979 B2
(45) Date of Patent: Apr. 26, 2022

(54) APPARATUS AND METHOD FOR MANUFACTURING DISPLAY DEVICE

(71) Applicants: Samsung Display Co., Ltd., Yongin-si (KR); KCTECH CO.,LTD., Anseong-si (KR)

(72) Inventors: Junggun Nam, Yongin-si (KR); Seungik Kang, Anseong-si (KR); Seungbae Kang, Yongin-si (KR); Pungseok Kim, Anseong-si (KR); Heesung Yang, Yongin-si (KR); Keunwoo Lee, Anseong-si (KR); Woojin Cho, Yongin-si (KR); Byoungkwon Choo, Yongin-si (KR)

(73) Assignees: SAMSUNG DISPLAY CO., LTD., Yongin-si (KR); KCTECH CO., LTD., Anseong-si (KR)

( * ) Notice: Subject to any disclaimer, the term of this patent is extended or adjusted under 35 U.S.C. 154(b) by 0 days.

(21) Appl. No.: 17/158,657

(22) Filed: Jan. 26, 2021

(65) Prior Publication Data

US 2021/0229236 A1    Jul. 29, 2021

(30) Foreign Application Priority Data

Jan. 29, 2020  (KR) ........................ 10-2020-0010481

(51) Int. Cl.
*B24B 37/07* (2012.01)
*B32B 38/00* (2006.01)
*B24B 37/20* (2012.01)

(52) U.S. Cl.
CPC .......... *B24B 37/07* (2013.01); *B32B 38/0012* (2013.01); *B24B 37/20* (2013.01); *B32B 2038/0064* (2013.01); *B32B 2457/20* (2013.01)

(58) Field of Classification Search
CPC ..... B24B 37/07; B24B 37/20; B32B 38/0012; B32B 2038/0064; B32B 2457/20
See application file for complete search history.

(56) References Cited

U.S. PATENT DOCUMENTS

| 7,552,679 | B2 * | 6/2009 | Koike | ................... B41J 2/2146 |
| | | | | 101/485 |
| 8,351,830 | B2 * | 1/2013 | Kudo | ..................... B65G 39/16 |
| | | | | 399/302 |
| 9,300,836 | B2 * | 3/2016 | Kokomoto | ......... G03G 15/5054 |

FOREIGN PATENT DOCUMENTS

| JP | 5599671 | 10/2014 |
| JP | 2018-20394 | 2/2018 |
| KR | 10-2009-0131018 | 12/2009 |
| KR | 10-2010-0110253 | 10/2010 |
| KR | 10-2017-0003434 | 1/2017 |

(Continued)

*Primary Examiner* — Michael N Orlando
*Assistant Examiner* — Abhishek A Patwardhan
(74) *Attorney, Agent, or Firm* — Kile Park Reed & Houtteman PLLC

(57) ABSTRACT

An apparatus for manufacturing a display device includes a moving part including a belt that circulates, a roller that circulates the belt, and at least one meandering prevention portion that moves in a first direction parallel to a direction of a rotation shaft of the roller and prevents meandering of the belt, and a polishing head disposed corresponding to the moving part, the polishing head polishing a surface of a base material disposed on a first surface of the belt. A part of the at least one meandering prevention portion faces a second surface of the belt, the second surface being a side surface of the belt.

10 Claims, 12 Drawing Sheets

(56) References Cited

FOREIGN PATENT DOCUMENTS

| KR | 10-1814279 | 1/2018 |
|----|------------|--------|
| KR | 10-1932431 | 12/2018 |

* cited by examiner

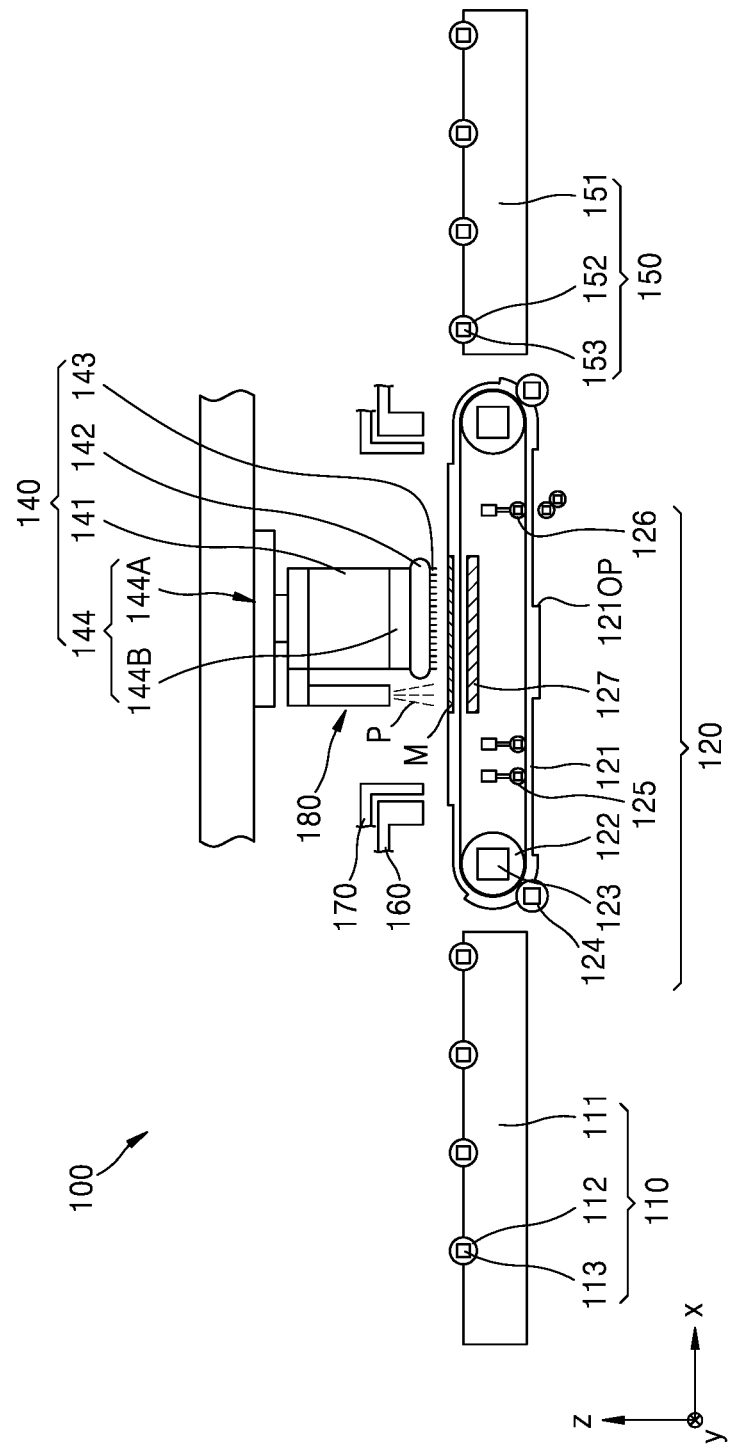

APPARATUS AND METHOD FOR MANUFACTURING DISPLAY DEVICE

CROSS-REFERENCE TO RELATED APPLICATION(S)

This application claims priority to and benefits of Korean Patent Application No. 10-2020-0010481 under 35 U.S.C. § 119, filed in the Korean Intellectual Property Office on Jan. 29, 2020, the entire contents of which are incorporated herein by reference.

BACKGROUND

1. Technical Field

One or more embodiments relate to an apparatus and method for manufacturing a display device.

2. Description of the Related Art

Mobile display devices are widely used. Tablet personal computers (PCs), in addition to small electronic devices, such as mobile phones, are widely used as mobile display devices.

These mobile display devices may support a variety of functions. Display devices may include a display area so as to provide visual information, such as an image or a video, to a user. Recently, as the sizes of other components for driving the display devices may be reduced, the portion of the display area in the display device is gradually increasing, and a structure that may be bendable to have a certain angle in a flat state has been also been developed.

A process of polishing a surface of a base material may be performed during a process of manufacturing display devices.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

One or more embodiments may include an apparatus and method for manufacturing a display device having high reliability.

Additional aspects will be set forth in part in the description which follows and, in part, will be apparent from the description, or may be learned by practice of the presented embodiments of the disclosure.

According to one or more embodiments, an apparatus for manufacturing a display device may include a moving part including, a belt that circulates, a roller that circulates the belt, and at least one meandering prevention portion that moves in a first direction parallel to a direction of a rotation shaft of the roller and prevents meandering of the belt, and a polishing head disposed corresponding to the moving part, the polishing head polishing a surface of a base material disposed on a first surface of the belt. A part of the at least one meandering prevention portion may face a second surface of the belt, the second surface being a side surface of the belt.

The at least one meandering prevention portion may include a first meandering prevention portion and a second meandering prevention portion, and the belt may be disposed between the first meandering prevention portion and the second meandering prevention portion.

The at least one meandering prevention portion may include a first roller of which at least part abuts the second surface in the first direction, and a first spacing adjusting portion that moves the first roller.

The at least one meandering prevention portion may further include a first driving portion that rotates the first roller.

The at least one meandering prevention portion may be disposed in a region in which a moving direction of the belt changes.

The moving part may further include a cleaning portion that cleans a surface of the belt.

The moving part may further include an adjusting portion facing and pressing against a third surface of the belt, the third surface being opposite to the first surface of the belt.

The apparatus may further include a measuring part that observes alignment marks disposed on the first surface of the belt.

The apparatus may further include a spray part that removes a polish disposed on the alignment marks.

The belt may include an opening on which the base material is disposed.

According to one or more embodiments, a method of manufacturing a display device may include observing alignment marks disposed on a first surface of a belt that circulates, comparing positions of the alignment marks with preset positions, and adjusting a position of the belt by using a meandering prevention portion in accordance with a result of the comparing of the positions. At least part of the meandering prevention portion may face a second surface of the belt, the second surface being a side surface of the belt.

The adjusting of the position of the belt may include moving the meandering prevention portion in a first direction to be in contact with the belt.

The meandering prevention portion may linearly move the belt in the first direction.

The meandering prevention portion may be disposed in a region in which a moving direction of the belt changes.

The meandering prevention portion may include a first roller of which at least a part faces the second surface, and a first spacing adjusting portion that moves the first roller.

The observing of the alignment marks may include removing a polish disposed on the alignment marks.

The method may further include cleaning a surface of the belt.

The method may further include pressing a third surface of the belt to maintain a tension of the belt, the third surface of the belt being opposite to the first surface of the belt.

The method may further include disposing a base material on the first surface, and polishing a surface of the base material by using a polishing head.

The belt may include an opening on which the base material is disposed.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7 and 8 are schematic front views illustrating an operating method of the apparatus for manufacturing a display device shown in FIG. 1;

DETAILED DESCRIPTION OF THE EMBODIMENTS

Figure 1:
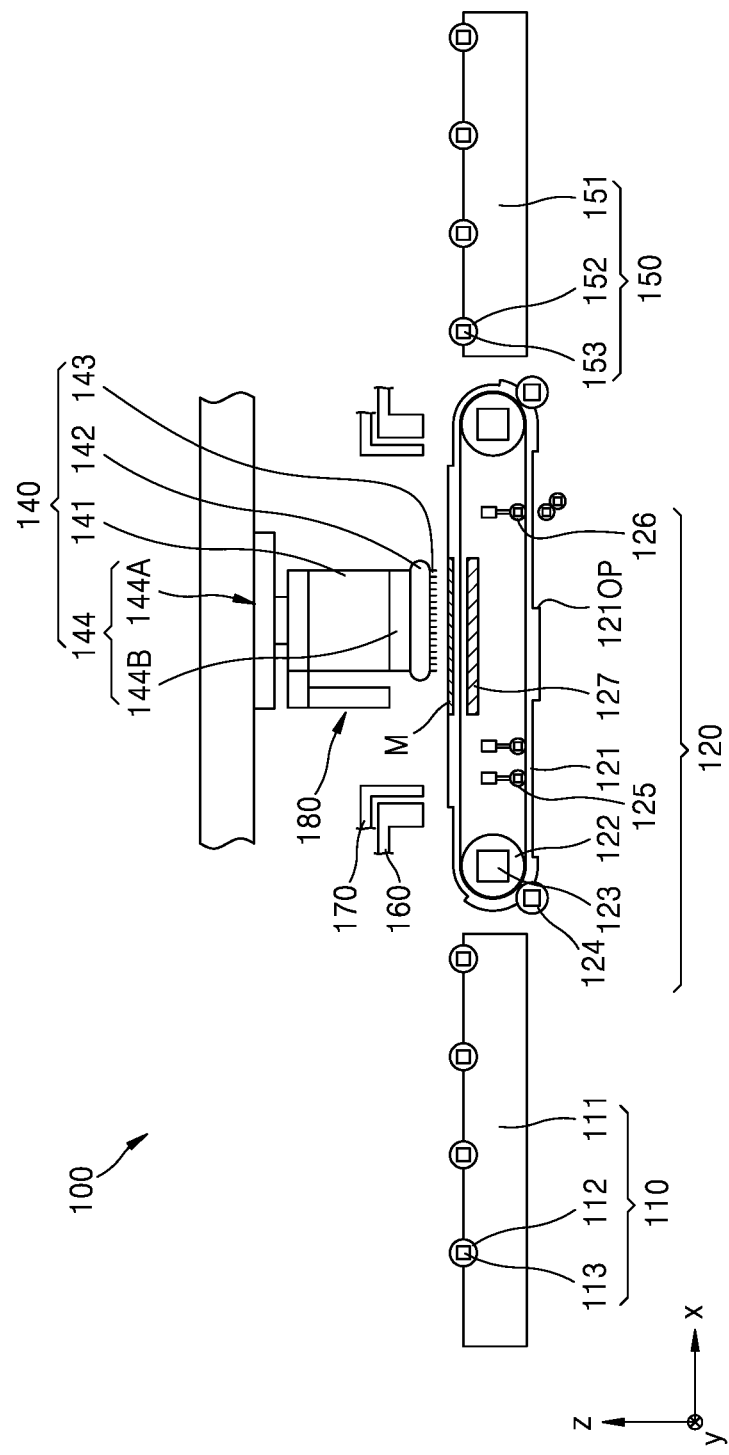
FIG. 1 is a schematic front view illustrating an apparatus for manufacturing a display device, according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects of the description.

As used herein, the term "and/or" includes any and all combinations of one or more of the associated listed items. The terms "and" and "or" may be used in the conjunctive or disjunctive sense and may be understood to be equivalent to "and/or." Throughout the disclosure, the expression "at least one of a, b or c" indicates only a, only b, only c, both a and b, both a and c, both b and c, all of a, b, and c, or variations thereof.

The term "overlap" may include layer, stack, face or facing, extending over, extending under, covering or partly covering or any other suitable term as would be appreciated and understood by those of ordinary skill in the art. The phrase "not overlap" may include apart from or set aside from or offset from and any other suitable equivalents as would be appreciated and understood by those of ordinary skill in the art.

It will be understood that although the terms "first," "second," etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that terms such as "comprises", "comprising", "has", "have", "having", "includes", and "including", as used herein specify the presence of stated features or components, but do not preclude the presence or addition of one or more other features or components.

It will be understood that when a layer, region, or component may be referred to as being "formed on," another layer, region, or component, it may be directly or indirectly formed on the other layer, region, or component. For example, intervening layers, regions, or components may be present.

Sizes of elements in the drawings may be exaggerated or reduced for convenience of explanation. In other words, since sizes and thicknesses of components in the drawings may be arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

It will be understood that when a layer, region, or component may be referred to as being "connected to," another layer, region, or component, it may be directly or indirectly connected to the other layer, region, or component. For example, intervening layers, regions, or components may be present. For example, it will be understood that when a layer, region, or component may be referred to as being "electrically connected to," another layer, region, or component, it may be directly or indirectly electrically connected to the other layer, region, or component. For example, intervening layers, regions, or components may be present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 5% of the stated value.

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Figure 2:
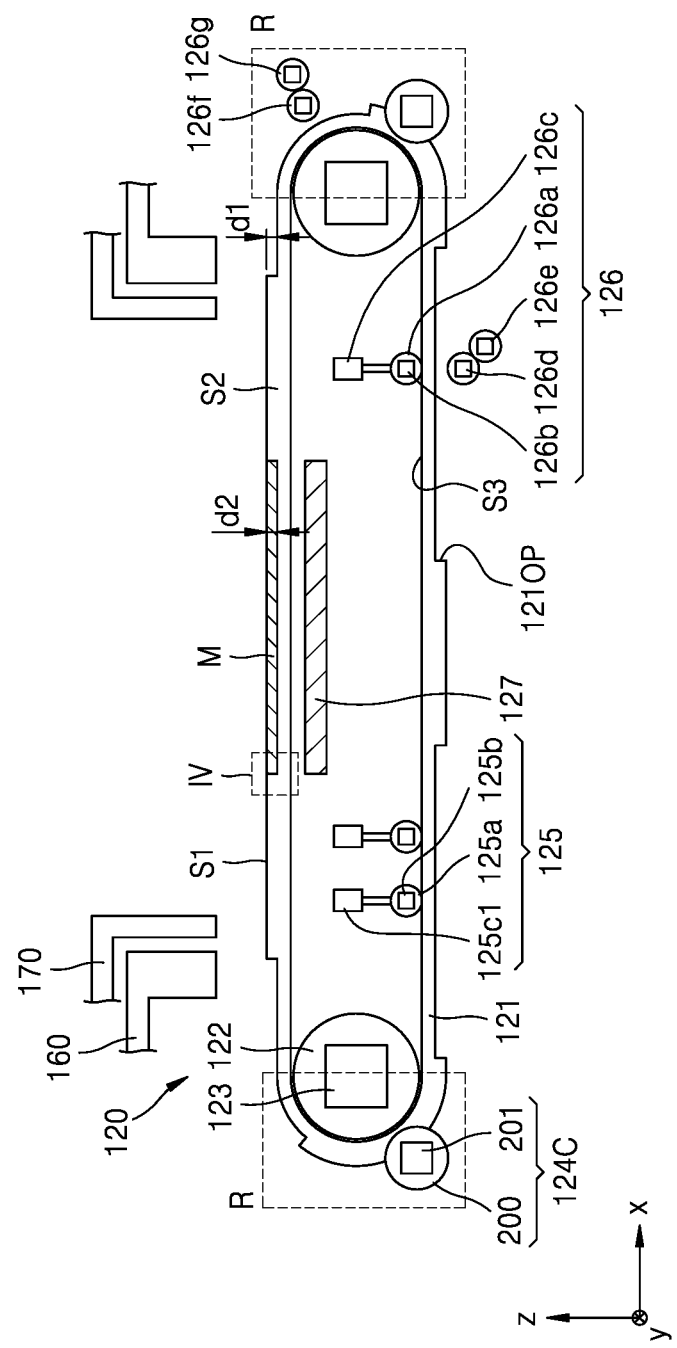
FIG. 2 is a schematic front view schematically illustrating part of the apparatus for manufacturing a display device.
Figure 3:
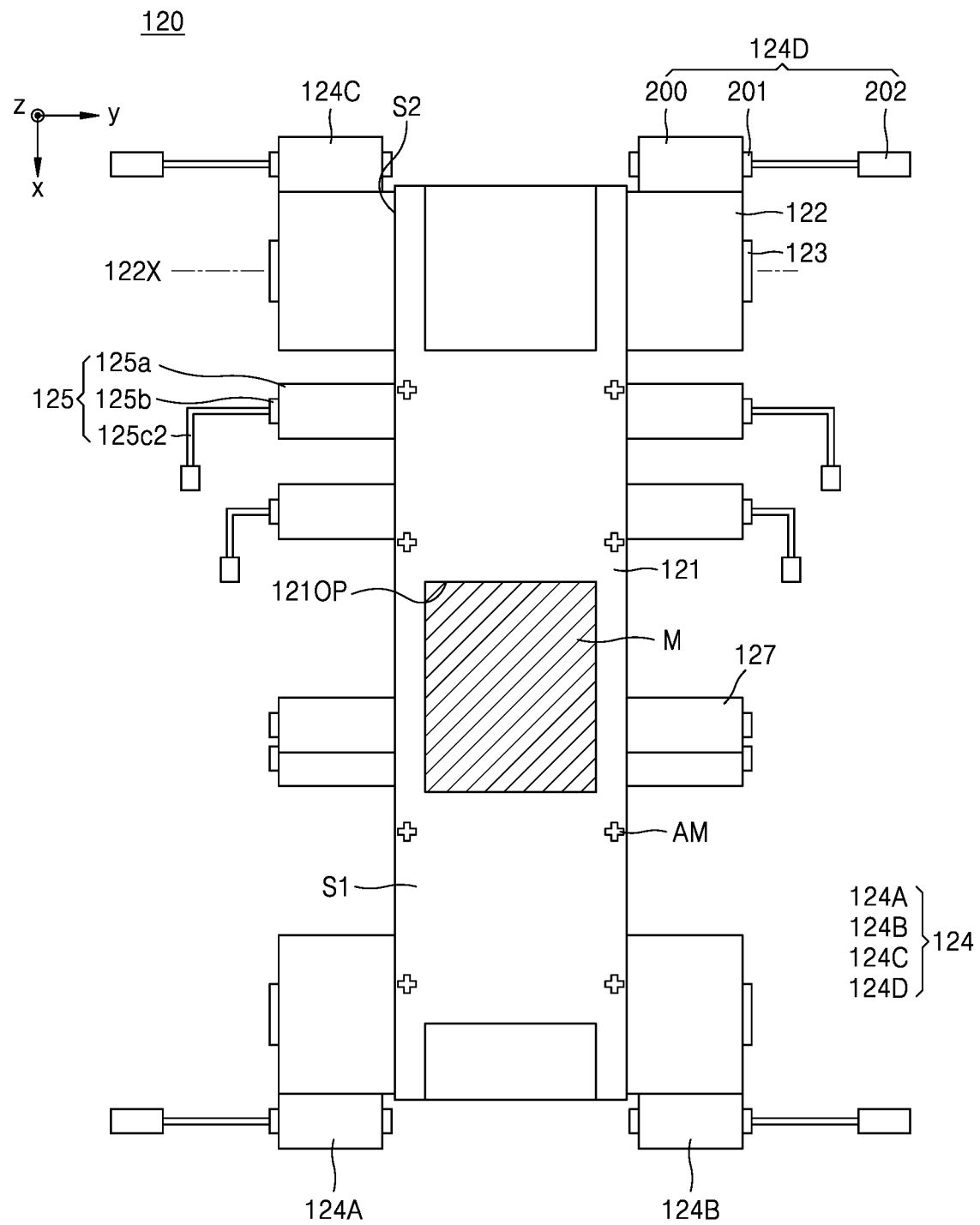
FIG. 3 is a schematic plan view schematically illustrating a moving part of the apparatus for manufacturing a display device.
Figure 4:
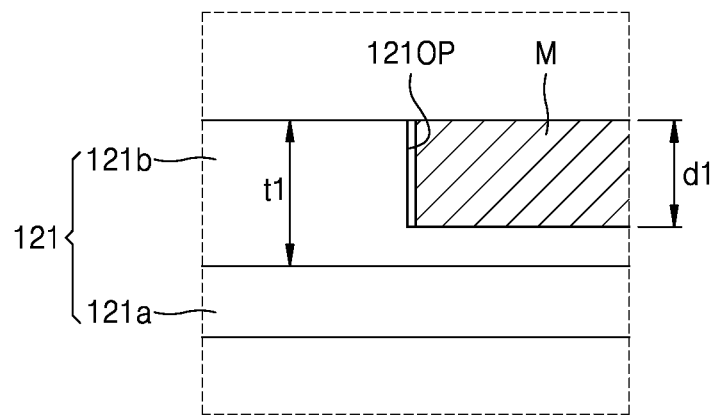
FIG. 4 is an enlarged schematic view of region IV of FIG. 2.

FIG. 1 is a schematic front view illustrating an apparatus 100 for manufacturing a display device, according to an embodiment. FIG. 2 is a schematic front view schematically illustrating part of the apparatus 100 for manufacturing a display device. FIG. 3 is a schematic front view schematically illustrating a moving part 120 of the apparatus 100 for manufacturing a display device. FIG. 4 is an enlarged schematic view of region IV of FIG. 2.

Referring to FIGS. 1 through 4, the apparatus 100 for manufacturing a display device may include an input part 110, the moving part 120, a polishing head 140, and a transport part 150.

In an embodiment, a base material M may be supplied to the input part 110 from the outside and seated on the input part 110. In another embodiment, the input part 110 may be omitted, and the base material M may be disposed (e.g., directly seated) on the moving part 120. However, hereinafter, the case where the base material M may be supplied to the input part 110 from the outside and seated on the input part 110 will be described in detail.

The input part 110 may include an input support portion 111, an input roller 112, and an input driving portion 113.

The input support portion 111 may include multiple frames connected to one another. At least one of the frames may be fixed to the ground or the inside of a building so that the input support portion 111 may be fixed.

The input roller 112 may be rotatably arranged on the input support portion 111. Multiple rollers 112 may be provided. The input rollers 112 may be apart from one another and may be arranged on the input support portion 111.

The input driving portion 113 may be connected to the input roller 112 and may rotate the input roller 112. The input driving portion 113 may be connected to at least one of the input rollers 112. In an embodiment, the input driving portion 113 may include a motor. Multiple input driving portions 113 may be provided. Thus, each of the input driving portions 113 may be arranged on each of the input rollers 112. In another embodiment, the input driving portion 113 may include a chain connected to the input rollers 112, a sprocket connected to the chain and rotating the chain, and a motor connected to the sprocket. In another embodiment, the input driving portion 113 may include all devices and structures connected to each of the input rollers 112 so as to rotate each input roller 112 or connected to some or all of the input rollers 112 so as to simultaneously rotate the input rollers 112. However, hereinafter, for convenience of explanation, the case where the input driving portion 113 may be arranged on each input roller 112 so as to rotate each input roller 112 will be described in detail.

The moving part 120 may provide a region in which the base material M supplied from the input part 110 may be polished. The moving part 120 may include a belt 121 that circulates, a roller 122 circulating the belt 121, a driving portion 123 driving the roller 122, a meandering prevention portion 124 (124A, 124B, 124C, and/or 124D) preventing meandering of the belt 121, an adjusting portion 125 pressing the belt 121, and a cleaning portion 126 cleaning the surface of the belt 121.

The belt 121 may be rotated by the roller 122, and the position of the belt 121 may be changed according to rotation of the roller 122. In an embodiment, the belt 121 may include an opening 121OP on which the base material M may be seated. The opening 121OP may be arranged to correspond to a first surface S1 of the belt 121, and the shape of the opening 121OP may correspond to the shape of the base material M. In another embodiment, a guard portion may be provided to the surface of the belt 121. The guard portion may be arranged on the first surface S1 of the belt 121, and the base material M may be inserted into the guard portion. However, for convenience of explanation, the case where the belt 121 includes the opening 121OP will be described in detail.

A depth d1 of the opening 121OP may be less than or similar to a thickness d2 of the base material M. The depth d1 of the opening 121OP may be equal to the thickness d2 of the base material M. Thus, in case that the polishing head 140 polishes edges of the base material M, pressure of the polishing head 140 may be prevented from being concentrated on the edges of the base material M due to a step between the belt 121 and the base material M.

The opening 121OP may designate the position of the base material M in case that the base material M may be seated on the belt 121. Here, designating of the position means that, because the base material M may be inserted into the opening 121OP, the position of the base material M may not be changed relative to the belt 121 due to the polishing process even in case that polishing may be performed. Thus, the surface of the base material M may be uniformly polished.

The belt 121 may include an alignment mark AM on the first surface S1 on which the base material M may be seated. In an embodiment, the alignment mark AM may be formed by irradiating laser on the first surface S1 of the belt 121. In another embodiment, the alignment mark AM may be attached to the first surface S1 of the belt 121.

Multiple alignment marks AM may be arranged on the first surface S1 of the belt 121. In an embodiment, the alignment marks AM may be arranged at regular intervals. A measuring part 160 that will be described later may observe the alignment marks AM provided on the belt 121 so that it may be determined whether the belt 121 meanders, and the position of the alignment marks AM may be checked so that the base material M may be input to the moving part 120. Also, the measuring part 160 may observe a distance between the alignment marks AM so that a degree of stretching of the belt 121 may be determined.

The alignment marks AM may have a variety of shapes. For example, the alignment marks AM may have a cross shape. In another example, the alignment marks AM may have a rectangular shape, a polygonal shape, or a circular shape. The width of each of the alignment marks AM may be about 50 μm. In another embodiment, the width of each alignment mark AM may be about 50 μm or less, or about 50 μm or more.

In an embodiment, the belt 121 may include multiple layers. For example, the belt 121 may include a first layer 121a and a second layer 121b. The first layer 121a may be a layer that contacts the roller 122, and the second layer 121b may be a layer on which the base material M may be arranged. The depth d1 of the opening 121OP may be less than a thickness t1 of the second layer 121b.

The first layer 121a may include a fiber material. For example, the first layer 121a may include a urethane fiber or the like. The second layer 121b may include a material having excellent chemical resistance. For example, the second layer 121b may include at least one of unsaturated polyester (UPE) and Teflon. Because a polishing process may be performed on an upper surface of the second layer 121b by using the polishing head 140, the second layer 121b may include a material having excellent chemical resistance and abrasion resistance.

In another embodiment, the belt 121 may have a single layer structure. The belt 121 may include a material having excellent chemical resistance. For example, the belt 121 may include at least one of UPE and Teflon.

The roller 122 may rotate so as to circulate the belt 121. For example, the roller 122 may rotate around a rotation shaft 122X. Multiple rollers 122 may be provided. The rollers 122 may be disposed apart from one another so as to maintain a constant tension of the belt 121.

The driving portion 123 may include a motor, etc., that may be arranged on the rollers 122 so as to rotate the rollers 122 around the rotation shaft 122X. The driving portion 123 may be arranged on at least one of the rollers 122.

The meandering prevention portion 124 may prevent meandering of the belt 121. The meandering prevention portion 124 may be arranged with the belt 121 between meandering prevention portions 124. For example, a first meandering prevention portion 124A and a second meandering prevention portion 124B may be arranged with the belt 121 therebetween. In detail, the first meandering prevention portion 124A and the second meandering prevention portion 124B may be arranged in a first direction (for example, a y-direction or −y-direction).

The meandering prevention portion 124 may be arranged in a region R in which the moving direction of the belt may be changed. The region R, in which the moving direction of the belt 121 may be changed, may be defined as a region in which the belt 121 may be circulated in a second direction (for example, an x-direction or −x-direction) and the moving direction of the belt 121 may be changed into a direction opposite to the second direction (for example, an −x-direction or x-direction). As another example, the region R, in which the moving direction of the belt 121 may be changed, may be defined as a region in which the belt 121 may be circulated in the direction opposite to the second direction and the moving direction of the belt 121 may be changed into the second direction. The meandering prevention portion 124 may be arranged adjacent to the rollers 122. For example, the first meandering prevention portion 124A and a third meandering prevention portion 124C may be arranged in the second direction (for example, an x-direction or −x-direction) crossing the first direction. Because the meandering prevention assembly 124 may be arranged on both ends of the belt 121, meandering of the belt 121 may be prevented.

At least part of the meandering prevention portion 124 may face a second surface S2 that may be a side surface of the belt 121. The second surface S2 may be defined as a surface of the belt 121 that may not be the first surface S1 and a third surface S3 opposite to the first surface S1. Thus, the meandering prevention portion 124 may guide the belt 121 so as to circulate in a constant path. Also, because the meandering prevention portion 124 may be in contact with the second surface S2 that may not be the first surface S1, damage of the first surface S1 may be prevented.

The meandering prevention portion 124 may move in the first direction (for example, a y-direction or −y-direction) parallel to the rotation shaft 122X of the rollers 122. In particular, the meandering prevention portion 124 may make a linear motion in the first direction. The first meandering prevention portion 124A and the second meandering prevention portion 1246 may move independently. For example, the first meandering prevention portion 124A and the second meandering prevention portion 1246 may move in the same direction. In another example, the first meandering prevention portion 124A and the second meandering prevention portion 1246 may move in opposite directions.

The meandering prevention portion 124 may include a first roller 200, a first driving portion 201, and a first spacing adjusting portion 202.

At least part of the first roller 200 may abut the second surface S2 of the belt 121 in the first direction (for example, a y-direction or −y-direction). Also, the first roller 200 may be rotatably arranged. In an embodiment, the first roller 200 may be in contact with the rollers 122. In another embodiment, the first roller 200 may be apart from the rollers 122. In an embodiment, the first roller 200 may rotate in an opposite direction to the rollers 122. For example, in case that the rollers 122 rotate clockwise, as shown in FIG. 2, the first roller 200 may rotate counterclockwise, as shown in FIG. 2.

The first driving portion 201 may rotate the first roller 200. The first driving portion 201 may include a motor, etc., similarly to the driving portion 123, and may be arranged on the first roller 200.

The first spacing adjusting portion 202 may move the first roller 200. The first spacing adjusting portion 202 may be connected to the first roller 200 and may linearly move the first roller 200. For example, the first spacing adjusting portion 202 may move the first roller 200 in the first direction (for example, a y-direction or −y-direction). The first spacing adjusting portion 202 may have a variety of shapes. For example, the first spacing adjusting portion 202 may include a cylinder. In another embodiment, the first spacing adjusting portion 202 may also include a ball screw and a motor connected to the ball screw. In another example, the first spacing adjusting portion 202 may also include a linear motor. As described above, the first spacing adjusting portion 202 may include all devices and all structures that may linearly move the first roller 200.

The adjusting portion 125 may press the third surface S3 of the belt 121. The adjusting portion 125 may face the third surface S3. For example, the adjusting portion 125 may be arranged between the rollers 122. The adjusting portion 125 may be in contact with the third surface S3 and may press the belt 121 so as to maintain the tension of the belt 121. Because the adjusting portion 125 does not press the first surface S1 of the belt 121, damage of the first surface S1 may be prevented. In an embodiment, at least one adjusting portion 125 may be provided. The adjusting portion 125 may include a second roller 125$a$, a second driving portion 125$b$, and second spacing adjusting portions 125$c$1 and 125$c$2.

The second roller 125$a$ may be rotatably arranged, and the second driving portion 125$b$ may be connected to the second roller 125$a$ so as to rotate the second roller 125$a$. The second driving portion 125$b$ may include a motor, etc., similarly to the first driving portion 201.

The second spacing adjusting portions 125$c$1 and 125$c$2 may move the second roller 125$a$. The second spacing adjusting portions 125$c$1 and 125$c$2 may be connected to the second roller 125$a$ so as to linearly move the second roller 125$a$. The second spacing adjusting portions 125$c$1 and 125$c$2 may include all devices and all structures that may linearly move the second roller 125$a$, similarly to the first spacing adjusting portion 202.

In an embodiment, the second spacing adjusting portions 125$c$1 and 125$c$2 may include a first portion 125$c$1 and a second portion 125$c$2. A direction in which the first portion 125$c$1 linearly moves the second roller 125$a$, and a direction in which the second portion 125$c$2 linearly moves the second roller 125$a$ may be different from each other. For example, the first portion 125$c$1 may move the second roller 125$a$ in a third direction (for example, a z-direction or −z-direction) crossing the first direction and/or the second direction. The second portion 125$c$2 may move the second roller 125$a$ in the second direction (for example, an x-direction or −x-direction).

The cleaning portion 126 may clean the surface of the belt 121. In an embodiment, the cleaning portion 126 may include a third roller 126$a$, a third driving portion 126$b$, a third spacing adjusting portion 126$c$, a first cleaning roller 126$d$, and a second cleaning roller 126$e$.

The third roller 126$a$, the third driving portion 126$b$, and the third spacing adjusting portion 126$c$ may be similar to the second roller 125$a$, the second driving portion 125$b$, and the second spacing adjusting portions 125$c$1 and 125$c$2. Thus, a detailed description thereof will be omitted. The third roller 126$a$ may support the belt 121 and the first cleaning roller 126$d$ while the first cleaning roller 126$d$ cleans the surface of the belt 121.

In an embodiment, each of the first cleaning roller 126$d$ and the second cleaning roller 126$e$ may rotate. Each of the first cleaning roller 126$d$ and the second cleaning roller 126$e$ may be connected to a driving portion so as to rotate.

The surface of the first cleaning roller 126d and the surface of the second cleaning roller 126e may be in contact with each other. The first cleaning roller 126d and the second cleaning roller 126e may rotate in different directions. For example, in case that the first cleaning roller 126d rotates counterclockwise, as shown in FIG. 2, the second cleaning roller 126e may rotate clockwise, as shown in FIG. 2.

The first cleaning roller 126d may clean the surface of the belt 121. In detail, the first cleaning roller 126d may be in contact with the belt 121 so as to adsorb a polish that remains on the surface of the belt 121. Also, the second cleaning roller 126e may adsorb the polish adsorbed onto the first cleaning roller 126d. The adsorption force of the second cleaning roller 126e may be greater than that of the first cleaning roller 126d. Thus, because, even in case that the polish may be adsorbed onto the surface of the first cleaning roller 126d, the second cleaning roller 126e simultaneously adsorbs the polish adsorbed onto the surface of the first cleaning roller 126d, the adsorption force of the first cleaning roller 126d may be maintained.

In an embodiment, the cleaning portion 126 may include a third cleaning roller 126f and a fourth cleaning roller 126g. Each of the third cleaning roller 126f and the fourth cleaning roller 126g may be arranged, similarly to each of the first cleaning roller 126d and the second cleaning roller 126e.

The third cleaning roller 126f and the fourth cleaning roller 126g may be arranged in the region R in which the moving direction of the belt 121 may be changed. While the third cleaning roller 126f cleans the surface of the belt 121, the roller 122 may support the third cleaning roller 126f. Thus, there may be no need for providing an additional third roller 126a, an additional third driving portion 126b, and an additional third spacing adjusting portion 126c for supporting the third cleaning roller 126f.

In an embodiment, the cleaning portion 126 may include the third roller 126a, the third driving portion 126b, the third spacing adjusting portion 126c, and the first through fourth cleaning rollers 126d through 126g. In some embodiments, the cleaning portion 126 may include the third roller 126a, the third driving portion 126b, the third spacing adjusting portion 126c, the first cleaning roller 126d, and the second cleaning roller 126e and may not include the third cleaning roller 126f and the fourth cleaning roller 126g. In some embodiments, the cleaning portion 126 may include the third cleaning roller 126f and the fourth cleaning roller 126g and may not include the third roller 126a, the third driving portion 126b, the third spacing adjusting portion 126c, the first cleaning roller 126d, and the second cleaning roller 126e. Hereinafter, for convenience of explanation, the case where the cleaning portion 126 includes the third roller 126a, the third driving portion 126b, the third spacing adjusting portion 126c, the first cleaning roller 126d and the second cleaning roller 126e and does not include the third cleaning roller 126f and the fourth cleaning roller 126g will be described in detail.

The moving part 120 may further include a base material supporting portion 127 arranged on the belt 121. The base material supporting portion 127 may support the base material M in case that the surface of the base material M may be polished. The base material supporting portion 127 may be arranged between the rollers 122 so as to correspond to the polishing head 140. The base material supporting portion 127 may have the shape of a plate.

The polishing head 140 may be arranged so as to correspond to the moving part 120. For example, the polishing head 140 may be arranged on the first surface S1 of the belt 121. The polishing head 140 may move in various directions. For example, the polishing head 140 may move in at least one of the x-direction, the y-direction, and the z-direction of FIG. 1.

The polishing head 140 may include a polishing head body portion 141, a polishing head rotation portion 142, a polishing pad 143, and a polishing driving portion 144.

In an embodiment, the polishing head body portion 141 may be connected to the polishing driving portion 144 and may make a linear motion. In another embodiment, the polishing head body portion 141 may be connected to the polishing driving portion 144 so as to make a reciprocating vibration motion. Hereinafter, the case where the polishing head body portion 141 may be connected to the polishing driving portion 144 and makes a linear motion will be described in detail.

The polishing head rotation portion 142 may be rotatably connected to the polishing head body portion 141. The polishing pad 143 may be connected to the polishing head rotation portion 142.

The polishing pad 143 may be arranged on the polishing head rotation portion 142, may have the shape of a plate, and may polish the surface of the base material M.

The polishing driving portion 144 may include a first polishing driving portion 144A, which may be arranged inside the polishing head body portion 141 so as to rotate the polishing head rotation portion 142, and a second polishing driving portion 144B, which may be connected to the polishing head body portion 141 and linearly moves the polishing head body portion 141.

In an embodiment, the first polishing driving portion 144A may include a motor connected to the polishing head rotation portion 142 so as to rotate the polishing head rotation portion 142. In another embodiment, the first polishing driving portion 144A may include a decelerator arranged between the motor connected to the polishing head rotation portion 142 so as to rotate the polishing head rotation portion 142 and the polishing head rotation portion 142.

The second polishing driving portion 144B may linearly move the polishing head body portion 141. At least one second polishing driving portion 144B may be provided. For example, multiple second polishing driving portions 144B may be provided. Each of the second polishing driving portions 144B may linearly move the polishing head body portion 141 in one of the x-direction, the y-direction, and the z-direction of FIG. 1. The second polishing driving portion 144B may be provided in various shapes. For example, the second polishing driving portion 144B may include a cylinder. In another example, the second polishing driving portion 144B may include a ball screw and a motor connected to the ball screw. In another example, the second polishing driving portion 144B may also include a linear motor. As described above, the second polishing driving portion 144B may include all devices and all structures that may be connected to the polishing head body portion 141 and linearly move the polishing head body portion 141 in various directions.

In an embodiment, the transport part 150 may transport the base material M so as to carry the base material M to the outside. In another embodiment, the transport part 150 may be omitted so that the base material M may be directly carried out of the moving part 120 to the outside. However, hereinafter, the case where the base material M may be carried out of the transport part 150 to the outside will be described in detail.

The transport part 150 may be apart from the moving part 120 so as to transport the polished base material M. The transport part 150 may include a transport supporting portion 151, a transport roller 152, and a transport driving portion 153. The transport supporting portion 151, the transport roller 152, and the transport driving portion 153 may be provided in the same way or similarly to the input support portion 111, the input roller 112, and the input driving portion 113.

The apparatus 100 for manufacturing a display device may further include the measuring part 160 and a spray part 170.

The measuring part 160 may observe the alignment marks AM arranged on the first surface S1. Also, the measuring part 160 may observe the base material M arranged on the first surface S1. In an embodiment, multiple measuring parts 160 may be provided. The measuring part 160 may observe each of the alignment marks AM and the base material M. Thus, a degree of meandering of the belt 121, the surface state of the belt 121, and whether the base material M may be arranged to correspond to the opening 121OP may be observed. The measuring part 160 may be an image capturing device, such as a camera.

The spray part 170 may remove a polish arranged on the alignment marks AM. For example, the polish may be disposed (e.g., arranged) on the alignment marks AM before the measuring part 160 observes the alignment marks AM. The polish may prevent the measuring part 160 from observing the alignment marks AM. The spray part 170 may spray gas so as to remove the polish arranged on the alignment marks AM. The spray part 170 may be an air blower.

Figure 5A:
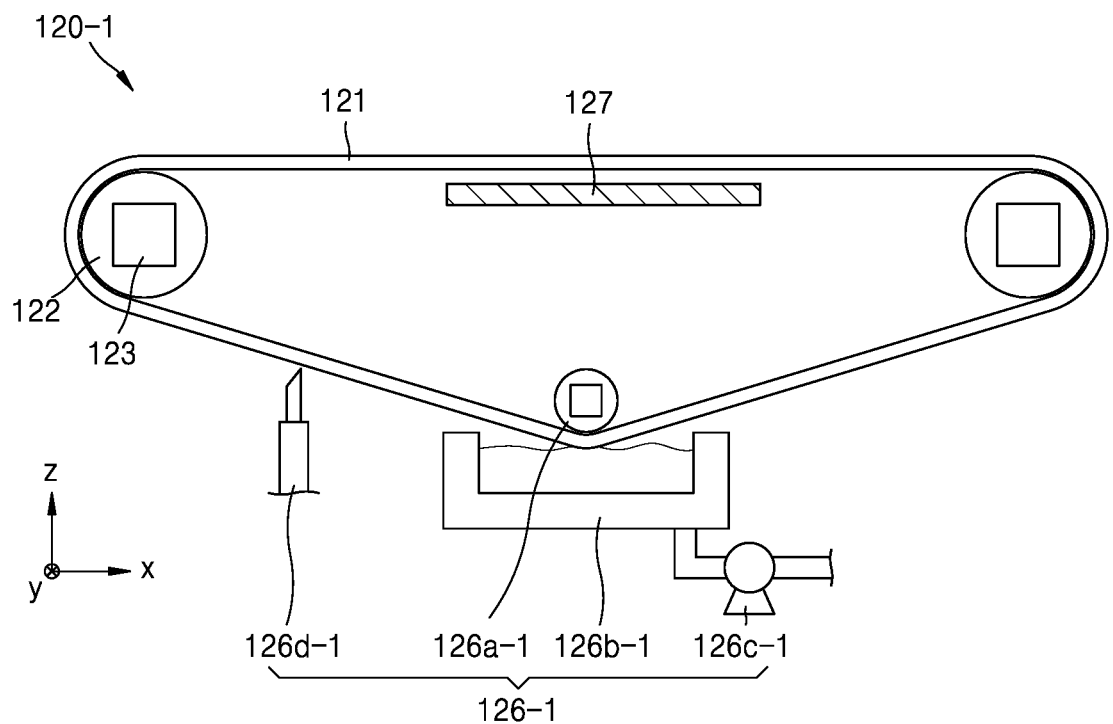
FIGS. 5A and 5B are schematic plan views illustrating part of a moving part according to another embodiment.
Figure 5B:
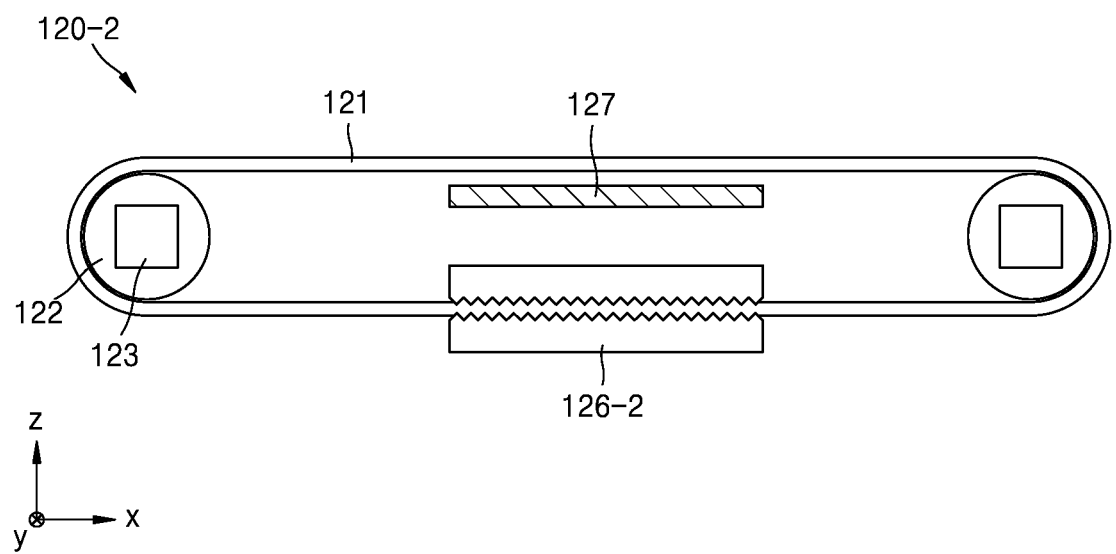

FIGS. 5A and 5B are schematic plan views illustrating part of a moving part according to another embodiment. The same reference numerals of FIGS. 5A and 5B as those of FIG. 2 may refer to the same elements and thus, a redundant description thereof will be omitted.

Referring to FIG. 5A, a moving part 120-1 may include a belt 121, a roller 122, a driving portion 123, a cleaning portion 126-1, and a base material support portion 127.

The cleaning portion 126-1 may clean the belt 121. The cleaning portion 126-1 may include a fixing roller 126a-1, a cleaning container 126b-1, a cleaning adjusting portion 126c-1, and a cleaning solution removal portion 126d-1.

The fixing roller 126a-1 may guide the belt 121 toward the cleaning container 126b-1. Thus, the belt 121 may be in contact with a cleaning solution in the cleaning container 126b-1. The fixing roller 126a-1 may be rotatable. Also, a driving portion may be connected to the fixing roller 126a-1.

The cleaning container 126b-1 may store the cleaning solution. The cleaning container 126b-1 may be connected to the cleaning adjusting portion 126c-1 so as to adjust the cleaning solution. For example, the cleaning adjusting portion 126c-1 may adjust the amount of the cleaning solution inside the cleaning container 126b-1. Also, the cleaning adjusting portion 126c-1 may exchange the cleaning solution.

The cleaning solution removal portion 126d-1 may remove cleaning solution that remains in the belt 121. For example, the cleaning solution removal portion 126d-1 may be a knife that contacts the belt 121. In another example, the cleaning solution removal portion 126d-1 may be an evaporator for evaporating the cleaning solution or an absorber for absorbing the cleaning solution.

Referring to FIG. 5B, a moving part 120-2 may include a belt 121, a roller 122, a driving portion 123, a cleaning portion 126-2, and a base material support portion 127.

The cleaning portion 126-2 may clean the belt 121. The belt 121 may penetrate the cleaning portion 126-2. In an embodiment, the cleaning portion 126-2 may include a brush. A polish may be removed using the brush. In another embodiment, the cleaning portion 126-2 may spray a cleaning solution toward the belt 121. The cleaning solution may be water. In some embodiments, the cleaning portion 126-2 may further include a cleaning solution removal portion (not shown) for removing the cleaning solution.

Hereinafter, an operation of the apparatus 100 for manufacturing a display device will be described in detail.

Figure 6A:
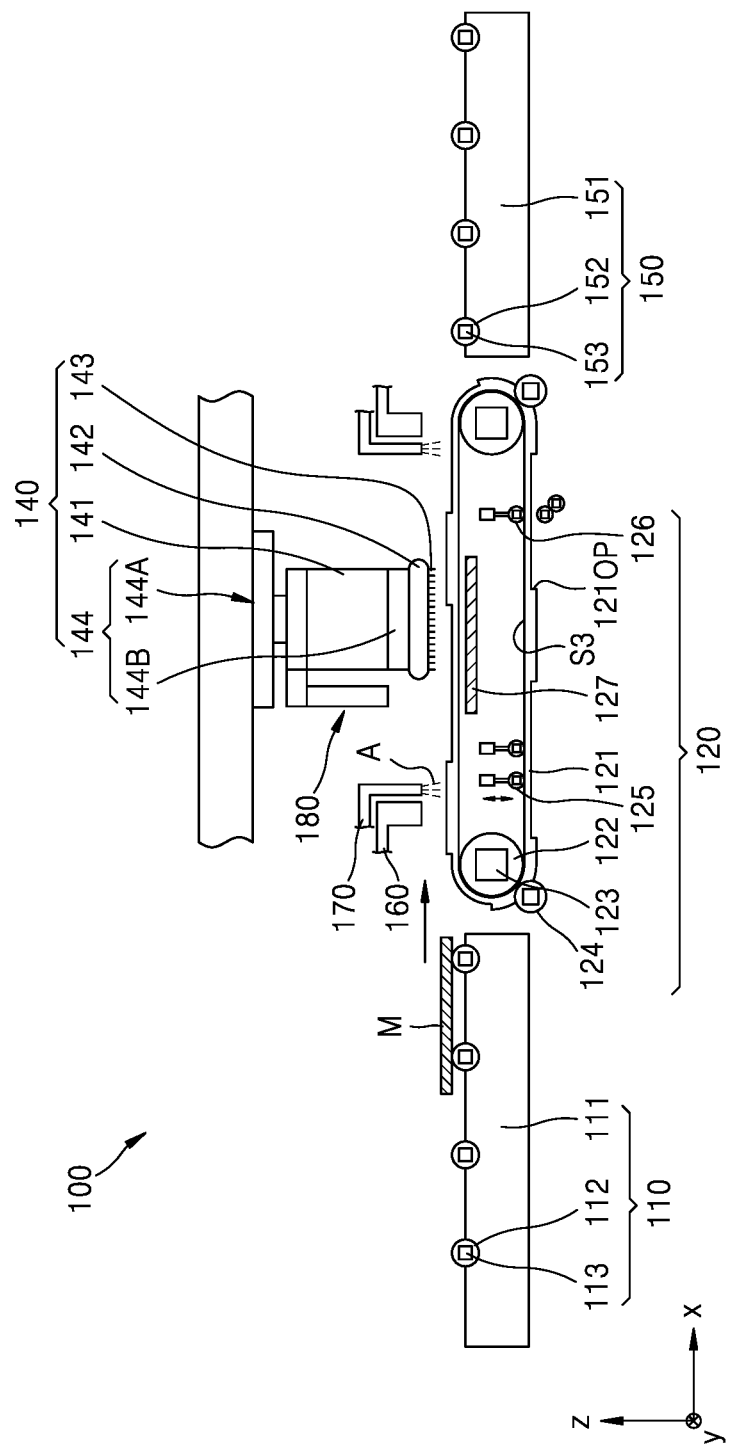
FIG. 6A is a schematic front view illustrating an operating method of the apparatus for manufacturing a display device shown in FIG. 1.
Figure 6B:
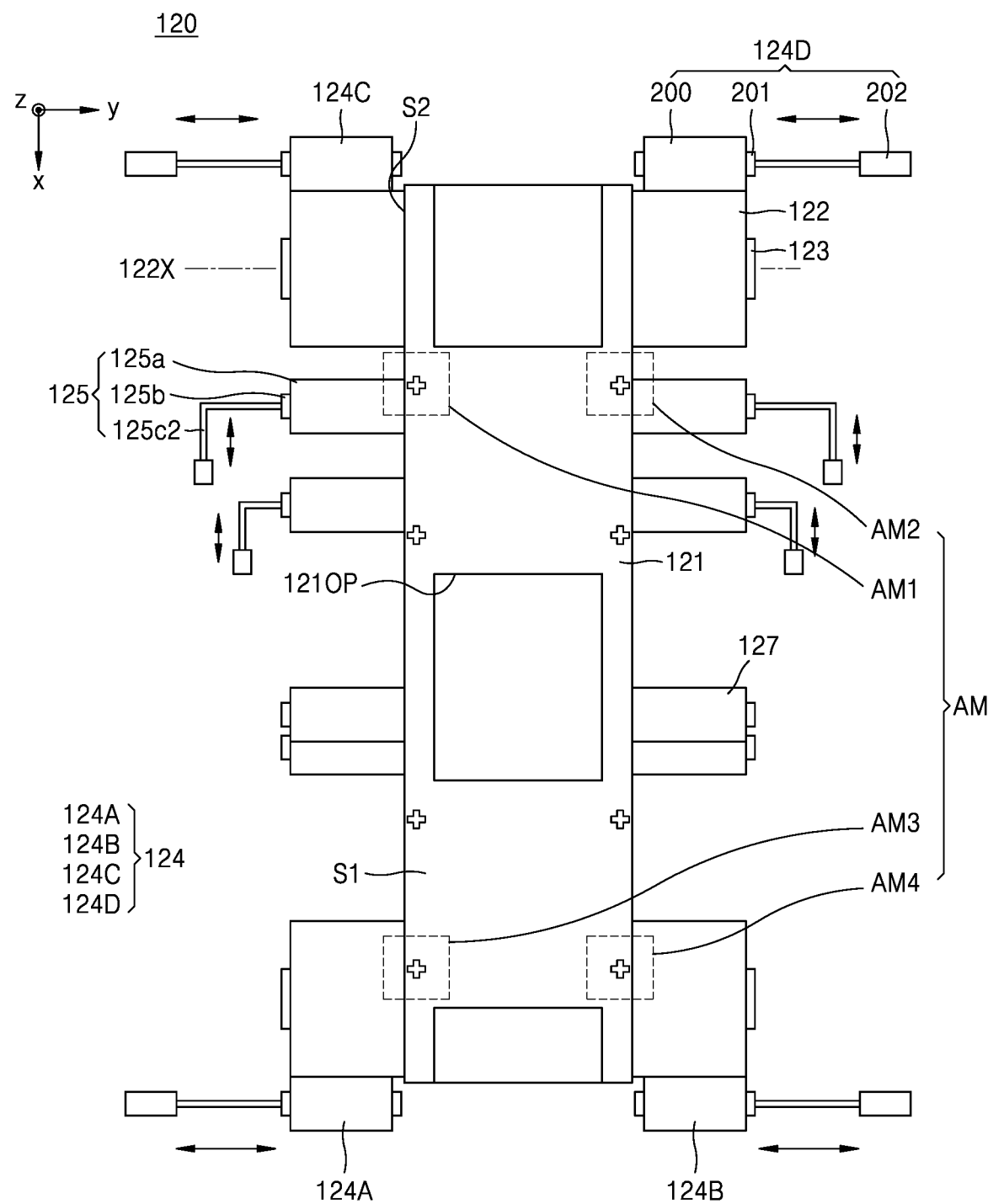
FIG. 6B is a schematic plan view illustrating an operating method of the apparatus for manufacturing a display device shown in FIG. 1.
Figure 8:
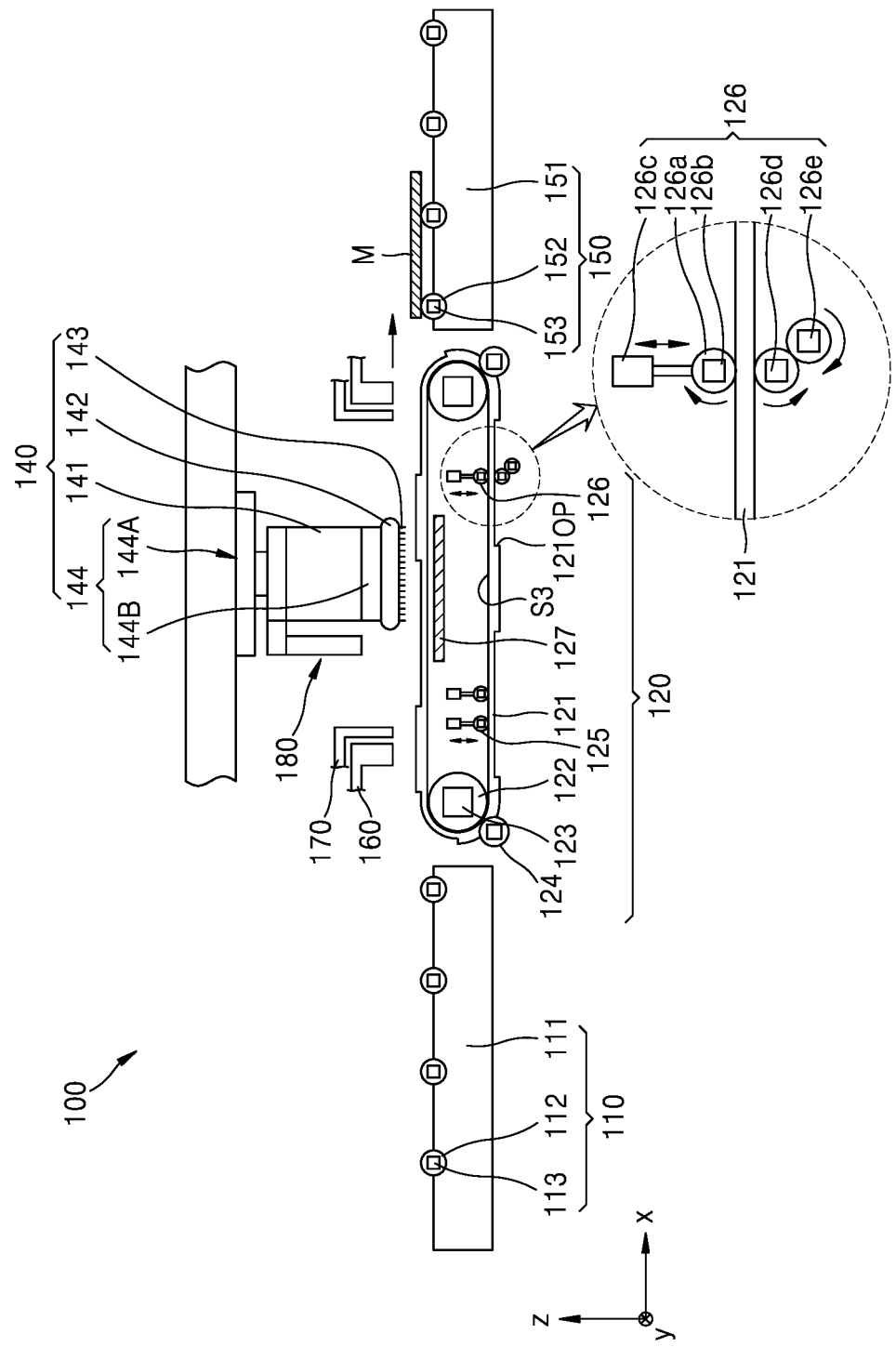

FIG. 6A is a schematic front view illustrating an operating method of the apparatus 100 for manufacturing a display device shown in FIG. 1. FIG. 6B is a schematic plan view illustrating an operating method of the apparatus 100 for manufacturing a display device shown in FIG. 1. FIGS. 7 and 8 are schematic front views illustrating an operating method of the apparatus 100 for manufacturing a display device shown in FIG. 1.

Referring to FIGS. 6A and 6B, alignment marks AM arranged on a first surface S1 of the belt 121 may be observed. A measuring part 160 may observe the alignment marks AM. Multiple measuring parts 160 may be provided. The measuring parts 160 may observe the alignment marks AM. For example, the measuring parts 160 may observe a first alignment mark AM1, a second alignment mark AM2, a third alignment mark AM3, and a fourth alignment mark AM4. Thus, whether meandering of the belt 121 occurs, the surface state of the belt 121, or whether the belt 121 may be stretched may be checked.

In case that the measuring parts 160 observe the alignment marks AM, the polish arranged on the alignment marks AM may be removed. In detail, the spray part 170 may spray a gas A onto the surface of the belt 121 so as to remove the polish. The gas A may be air. For example, in case that the polish may be arranged on the alignment marks AM, the spray part 170 may spray the gas A onto the first surface S1 of the belt 121 so as to remove the polish. Thus, the measuring parts 160 may easily observe the alignment marks AM.

Positions of the alignment marks AM may be compared with preset positions. For example, the position of the first alignment mark AM1 and the position of the second alignment mark AM2 may be compared with a preset position of the first alignment mark AM1 and a preset position of the second alignment mark AM2, so that it may be determined whether meandering of the belt 121 occurs. Also, the position of the third alignment mark AM3 and the position of the fourth alignment mark AM4 may be compared with a preset position of the third alignment mark AM3 and a preset position of the fourth alignment mark AM4, so that it may be determined whether meandering of the belt 121 occurs. In another example, the position of the first alignment mark AM1 and the position of another alignment mark (e.g., the third alignment mark AM3) may be compared with the preset position of the first alignment mark AM1 and another alignment mark (e.g., the preset position of the third alignment mark AM3), so that it may be determined whether the belt 121 may be stretched.

In case that the positions of the alignment marks AM may be different from the preset positions, the position of the belt 121 may be adjusted by using a meandering prevention portion 124. In detail, the meandering prevention portion 124 may move in a first direction (for example, a y-direction or −y-direction) so as to be in contact with the belt 121. A first meandering prevention portion 124A and a second meandering prevention portion 124B may move independently. For example, in a state in which, in FIG. 6B, the first meandering prevention portion 124A may be stopped, the second meandering prevention portion 124B may move in the y-direction or −y-direction. In another example, in a state in which the second meandering prevention portion 124B may be stopped, the first meandering prevention portion 124A may move in the y-direction or −y-direction. In another example, the first meandering prevention portion 124A and the second meandering prevention portion 124B may move in the same direction or in opposite directions.

The meandering prevention portion 124 may move the belt 121 in the first direction (for example, the y-direction or −y-direction). The belt 121 moving in the first direction means that part of the belt 121 arranged in a region in which the moving direction of the belt 121 may be changed, moves in the first direction. As another example, the belt 121 moving in the first direction may mean that the belt 121 entirely moves in the first direction. Thus, the meandering prevention portion 124 may recover a circulating path of the belt 121 in case that the circulating path of the belt 121 may be changed, e.g., due to an external factor.

Also, a third surface S3 of the belt 121 may be pressed so that the tension of the belt 121 may be adjusted (e.g., maintained). In detail, the adjusting portion 125 may press the third surface S3 of the belt 121. Thus, the tension of the belt 121 may be maintained. In the embodiment, the belt 121 may circulate due to a roller 122 and may be in contact with the polishing head 140. Thus, the length of the belt 121 may be stretched while a polishing process may be performed. The adjusting portion 125 may press the third surface S3 of the belt 121 so as to maintain the tension of the belt 121. Because the adjusting portion 125 may not be in contact with the first surface S1 of the belt 121, damage of the first surface S1 may be prevented.

The base material M may be arranged on an input part 110 from the outside in various manners. For example, the base material M may be transported to the input part 110 through a robot arm. In another example, the base material M may also be supplied by a user to the input part 110 manually through an additional tool.

The base material M may also be disposed (e.g., directly mounted) on the input part 110 or may be arranged on the input part 110 in a state in which the base material M may be seated on an additional carrier member (not shown). The carrier member may have the shape of a plate including glass or the like. Hereinafter, for convenience of explanation, the case where the base material M may be disposed (e.g., directly arranged) on the input unit 110 will be described in detail.

The base material M have various shapes. For example, the base material M may be used in case that a single display device (not shown) may be manufactured. In another example, the base material M may be used in case that multiple display devices may be manufactured. After multiple display areas (not shown) may be formed in the base material M, the base material M may be divided into multiple parts so as to correspond to each of the display areas.

The base material M may include various materials. The base material M may include glass or polymer resin, such as polyethersulfone, polyarylate, polyetherimide, polyethylene naphthalate, polyethylene terephthalate, polyphenylene sulfide, polyimide, polycarbonate (PC), cellulose triacetate (TAC), cellulose acetate propionate, or a combination thereof.

The measuring unit 160 may observe the base material M so that an input driving portion 113 and a driving portion 123 may be induced so as to interlock with each other. In case that the driving portion 123 operates, the roller 122 may rotate so as to rotate the belt 121.

The base material M may be transported from the input part 110 to the moving part 120. The base material M may be seated on the belt 121. In particular, the base material M may be arranged so as to correspond to an opening 121OP. The measuring part 160 may observe the base material M so that the base material M may be induced to be seated on the opening 121OP. Thus, the position of the base material M may not be changed relative to the belt 121.

Referring to FIG. 7, the driving portion 123 may operate in such a way that the base material M may be arranged in a preset position. The base material M may be arranged on a bottom surface of the polishing head 140.

In an embodiment, the operation of the driving portion 123 may be stopped so that the position of the base material M may be fixed. Subsequently, a first polishing driving portion 144A and a second polishing driving portion 144B may operate so that the polishing head 140 may make a linear motion and a surface of the base material M may be polished. In another embodiment, a surface of the base material M may be polished in a state in which the operation of the driving portion 123 may be maintained. A surface of the base material M may be polished while the base material M moves along a certain path (for example, an x-direction).

While polishing may be performed or before polishing may be performed, a polish P may be supplied to one surface of the base material M. The polish P may be supplied in various manners. For example, the polish P may be supplied to the base material M through the polishing head 140. In detail, the polish P may be supplied from the outside through a flow path formed inside the polishing head 140. A hole, through which the polish P may be supplied, may be formed in the polishing pad 143. In another example, the polish P may also be supplied to one surface of the base material M through a polish supplying portion 180 separately provided for each polishing head 140. The polish supplying portion 180 may be provided in the shape of a nozzle. Hereinafter, for convenience of explanation, the case where the polish supplying portion 180 may be separately provided from the polishing head 140 and the polish P may be supplied to the base material M before the polishing head 140 operates will be described in detail.

The polish P may include deionized water (DIW), a surfactant, and a slurry.

Referring to FIG. 8, polishing on one surface of the base material M may be finished so that the base material M may be transported to a transport part 150. The measuring part 160 may check the position of the base material M so that the driving portion 123 and a transport driving portion 153 may be induced to interlock with each other.

Also, the surface of the belt 121 may be cleaned. In detail, polish P that remains on the surface of the belt 121 may be removed. In an embodiment, a cleaning portion 126 may include a third roller 126a, a third driving portion 126b, a third spacing adjusting portion 126c, a first cleaning roller 126d, and a second cleaning roller 126e. The first cleaning roller 126d may clean the surface of the belt 121. The second cleaning roller 126e may be connected to the first cleaning roller 126d so as to adsorb the polish P adsorbed onto the first cleaning roller 126d. The first cleaning roller 126d and the second cleaning roller 126e may rotate in different directions. In another embodiment, the cleaning portion 126 may include the fixing roller 126a-1, the cleaning container 126b-1, the cleaning adjusting portion 126c-1, and the cleaning solution removal portion 126d-1, which are shown in FIG. 5A, and may clean the belt 121. In another embodiment, as shown in FIG. 5B, the belt 121 may penetrate the cleaning portion 126-2, and the cleaning portion 126-2 may clean the belt 121.

In an embodiment, the apparatus 100 for manufacturing a display device may include the meandering prevention portion 124 so as to precisely adjust the belt 121 on which the base material M may be seated. Thus, a surface of the base material M may be uniformly flat.

Figure 9:
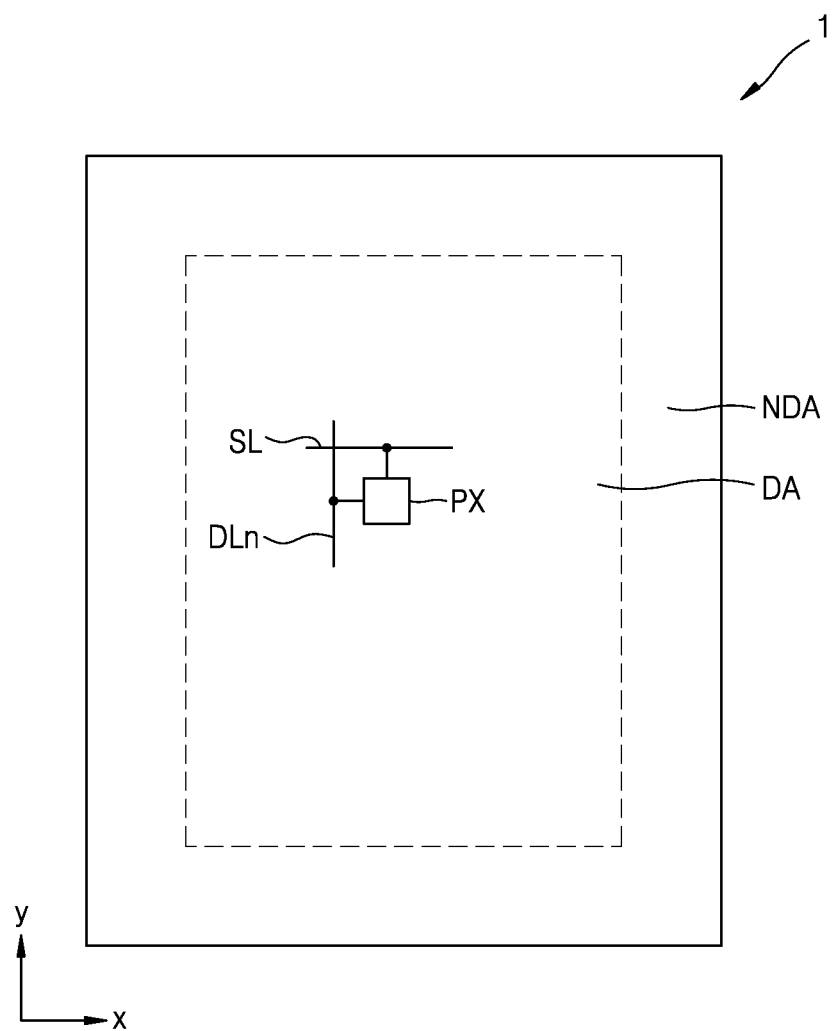
FIG. 9 is a schematic plan view schematically illustrating a display device manufactured by the apparatus for manufacturing a display device according to an embodiment.

FIG. 9 is a schematic plan view schematically illustrating a display device manufactured by the apparatus for manufacturing a display device according to an embodiment.

Referring to FIG. 9, a display device 1 may include a display area DA, in which an image may be realized, and a non-display area NDA, in which no image may be realized. The display device 1 may provide an image by using light emitted from pixels PX arranged in the display area DA. Each of the pixels PX may emit red, green, blue, or white light.

The display device 1 that may be a device for displaying an image may be a portable mobile device, such as a game console, a multimedia device, a tiny personal computer (PC). The display device 1 that will be described later may include a liquid crystal display (LCD) device, an electrophoretic display device, an organic light-emitting display device, an inorganic electroluminescent (EL) display device, a field emission display device, a surface-conduction electron-emitter display device, a quantum dot display device, a plasma display device, or a cathode ray display device. Hereinafter, the display device 1 manufactured by an apparatus for manufacturing a display device according to an embodiment will be described as an example of an organic light-emitting display device. However, manufacturing of a display device in various manners described above may be described in embodiments.

The pixels PX may be electrically connected to each of a scan line SL and a data line DLn. The scan line SL may extend in the x-direction, and the data line DLn may extend in the y-direction.

Figure 10:
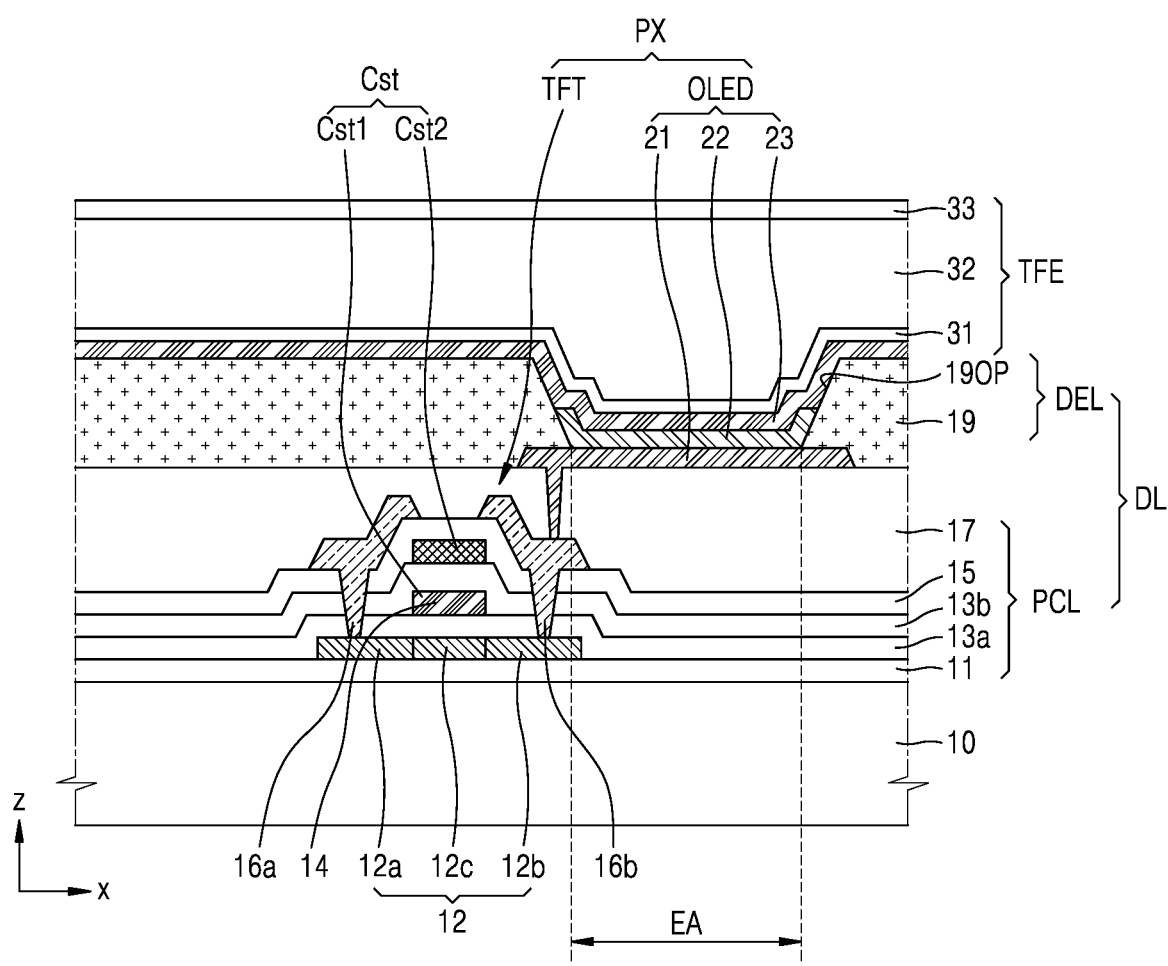
FIG. 10 is a schematic cross-sectional view schematically illustrating a display device manufactured by the apparatus for manufacturing a display device according to an embodiment.

FIG. 10 is a schematic cross-sectional view schematically illustrating a display device manufactured by the apparatus for manufacturing a display device according to an embodiment.

Referring to FIG. 10, a display layer DL and a thin-film encapsulation layer TFE may be arranged on a substrate 10. The display layer DL may include a pixel circuit layer PCL and a display element layer DEL.

The substrate 10 may include glass or polymer resin, such as polyethersulfone, polyarylate, polyetherimide, polyethylene naphthalate, polyethylene terephthalate, polyphenylene sulfide, polyimide, PC, TAC, cellulose acetate propionate, or a combination thereof.

A barrier layer (not shown) may be further arranged between the display layer DL and the substrate 10. The barrier layer that may be a barrier layer for preventing penetration of external foreign substances may have a single layer or multi-layer structure including an inorganic material, such as silicon nitride ($SiN_x$) (where x>0) or silicon oxide ($SiO_x$) (where x>0).

The pixel circuit layer PCL may be arranged on the substrate 10. FIG. 10 illustrates that the pixel circuit layer PCL includes a thin-film transistor TFT, a buffer layer 11, a first gate insulating layer 13a, a second gate insulating layer 13b, an interlayer insulating layer 15, and a planarization insulating layer 17, which may be arranged under and/or on components of the thin-film transistor TFT.

The buffer layer 11 may include inorganic insulating materials, such as silicon nitride, silicon oxynitride, and silicon oxide, and may have a single layer or multi-layer structure including the inorganic insulating materials described above.

The thin-film transistor TFT may include a semiconductor layer 12, and the semiconductor layer 12 may include polysilicon. As another example, the semiconductor layer 12 may include amorphous silicon, an oxide semiconductor, or an organic semiconductor. The semiconductor layer 12 may include a channel region 12c, and a drain region 12a and a source region 12b, which may be arranged at both sides of the channel region 12c. A gate electrode 14 may overlap the channel region 12c.

The gate electrode 14 may include a low resistance metallic material. The gate electrode 14 may include conductive materials including molybdenum (Mo), aluminum (Al), copper (Cu), titanium (Ti), or a combination thereof, and may have a multi-layer or single layer structure including the materials described above.

The first gate insulating layer 13a between the semiconductor layer 12 and the gate electrode 14 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_2$), or a combination thereof.

The second gate insulating layer 13b may be provided to cover the gate electrode 14. The second gate insulating layer 13b may include an inorganic insulating material, such as, silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_2$), or a combination thereof, similarly to the first gate insulating layer 13a.

An upper electrode Cst2 of a storage capacitor Cst may be arranged on the second gate insulating layer 13b. The upper electrode Cst2 may overlap the gate electrode 14 thereunder. The gate electrode 14 and the upper electrode Cst2 that overlap each other with the second gate insulating layer 13b therebetween may form the storage capacitor Cst. For example, the gate electrode 14 may function as a lower electrode Cst1 of the storage capacitor Cst.

In this way, the storage capacitor Cst and the thin-film transistor TFT may overlap each other. In some embodiments, the storage capacitor Cst may not overlap the thin-film transistor TFT.

The upper electrode Cst2 may include Al, platinum (Pt), palladium (Pd), silver (Ag), magnesium (Mg), gold (Au), nickel (Ni), neodymium (Nd), iridium (Ir), chromium (Cr), calcium (Ca), Mo, Ti, tungsten (W), and/or Cu and may have a single layer or multi-layer structure including the materials described above.

The interlayer insulating layer 15 may cover the upper electrode Cst2. The interlayer insulating layer 15 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_2$), or a combination thereof. The interlayer insulating layer 15 may have a single layer or multi-layer structure including the inorganic insulating materials described above.

Each of a drain electrode 16a and a source electrode 16b may be arranged on the interlayer insulating layer 15. The drain electrode 16a and the source electrode 16b may include materials having good conductivity. The drain electrode 16a and the source electrode 16b may include conductive materials including Mo, Al, Cu, Ti, or a combination thereof, and may have a multi-layer or single layer structure including the materials described above. In an embodiment, the drain electrode 16a and the source electrode 16b may have a multi-layer structure of Ti/Al/Ti.

The planarization insulating layer 17 may have a single layer or multi-layer structure including layers formed of organic materials or inorganic materials. In case that the planarization insulating layer 17 includes organic materials, the planarization insulating layer 17 may include general-purpose polymer, such as polymethylmethacrylate (PMMA) or polystyrene (PS), a polymer derivative having a phenol-based group, acryl-based polymer, imide-based polymer, aryl ether-based polymer, amide-based polymer, fluorine-based polymer, p-xylene-based polymer, vinyl alcohol-based polymer, or a blend thereof. On the other hand, in case that the planarization insulating layer 17 includes inorganic materials, the planarization insulating layer 17 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_2$), or a combination thereof. After the planarization insulating layer 17 may be formed, a polishing process may be performed so as to provide a flat top surface.

A display element layer DEL may be arranged on the pixel circuit layer PCL having the structure described above. The display element layer DEL may include an organic light-emitting diode OLED, and a pixel electrode 21 of the organic light-emitting diode OLED may be electrically connected to the thin-film transistor TFT via a contact hole of the planarization insulating layer 17.

The pixels PX may include the organic light-emitting diode OLED and the thin-film transistor TFT. Each of the pixels PX may emit red, green, or blue light, or red, green, blue, or white light, for example, from the organic light-emitting diode OLED.

The pixel electrode 21 may include conductive oxide, such as indium tin oxide (ITO), indium zinc oxide (IZO), zinc oxide (ZnO), indium oxide ($In_2O_3$), indium gallium oxide (IGO), aluminum zinc oxide (AZO), or a combination thereof. In another embodiment, the pixel electrode 21 may include a reflective layer including Ag, Mg, Al, Pt, Pd, gold (Au), nickel (Ni), neodymium (Nd), Ir, Cr, or a compound thereof. In another embodiment, the pixel electrode 21 may further include a layer formed of ITO, IZO, ZnO, or $In_2O_3$ on/under the above-described reflective layer.

A pixel-defining layer 19 having an opening 19OP for exposing the center of the pixel electrode 21 may be arranged on the pixel electrode 21. The pixel-defining layer 19 may include organic insulating materials and/or inorganic insulating materials. The opening 19OP may define an emission area EA of light emitted from the organic light-emitting diode OLED. For example, the width of the opening 19OP may correspond to the width of the emission area EA.

A light-emitting layer 22 may be arranged on the opening 19OP of the pixel-defining layer 19. The light-emitting layer 22 may include polymer or small molecular weight organic materials that emit light of certain colors.

Although not shown, a first functional layer and a second functional layer may be arranged under and on the light-emitting layer 22, respectively. The first functional layer may include a hole transport layer (HTL) or an HTL or a hole injection layer (HIL), for example. The second functional layer that may be a component arranged on the light-emitting layer 22 may be optional. The second functional layer may include an electron transport layer (ETL) and/or an electron injection layer (EIL). The first functional layer and/or the second functional layer may be a common layer formed to entirely cover the substrate 10, like a common electrode 23 that will be described later.

The common electrode 23 may include conductive materials having a small work function. For example, the common electrode 23 may include a (semi-) transparent layer including Ag, magnesium (Mg), Al, Pt, Pd, Au, Ni, Nd, Ir, Cr, lithium (Li), calcium (Ca), or an alloy thereof. As another example, common electrode 23 may further include a layer, such as ITO, IZO, ZnO, or $In_2O_3$, on the (semi-)transparent layer including the materials described above.

In an embodiment, the thin-film encapsulation layer TFE may include at least one inorganic encapsulation layer and at least one organic encapsulation layer. In an embodiment, FIG. 10 illustrates that the thin-film encapsulation layer TFE includes a first inorganic encapsulation layer 31, an organic encapsulation layer 32, and a second inorganic encapsulation layer 33, which may be sequentially stacked on each other.

The first inorganic encapsulation layer 31 and the second inorganic encapsulation layer 33 may include one or more inorganic materials from among aluminum oxide, titanium oxide, tantalum oxide, hafnium oxide, zinc oxide, silicon oxide, silicon nitride, and silicon oxynitride. The organic encapsulation layer 32 may include polymer-based materials. The polymer-based materials may include acryl-based resin, epoxy-based resin, polyimide, polyethylene, or a combination thereof. In an embodiment, the organic encapsulation layer 32 may include acrylate.

In another embodiment, the thin-film encapsulation TFE may have a structure in which the substrate 10 and an upper substrate that may be a transparent member may be combined with each other by using a sealing member and thus an internal space between the substrate 10 and the upper substrate may be sealed. An absorbent or filling material may be deposited in the internal space. The sealing member may be a sealant. In another embodiment, the sealing member may include a material cured by laser. For example, the sealing member may be frit. In detail, the sealing member may include urethane-based resin, epoxy-based resin, acryl-based resin, or a combination thereof that may be an organic sealant, or silicon that may be an inorganic sealant. The urethane-based resin may include urethane acrylate, for example. The acryl-based resin may include butylacrylate, ethylhexyl acrylate, or a combination thereof. The sealing member may include a material cured by heat.

A touch electrode layer (not shown) including touch electrodes may be arranged on the thin-film encapsulation layer TFE, and an optical functional layer (not shown) may be arranged on the touch electrode layer. The touch electrode layer may attain coordinate information according to an external input, for example, a touch event. The optical functional layer may reduce reflectivity of light (external light) incident toward the display device 1 from the outside and/or may enhance color purity of light emitted from the display device 1. In an embodiment, the optical functional layer may include a phase retarder and a polarizer. The phase retarder may be of a film type or liquid crystal coating type and may include a λ/2 phase retarder and/or a λ/4 phase retarder. The polarizer may also be of a film type or liquid crystal coating type. The film type may include an elongation-type synthetic resin film, and the liquid crystal coating type may include liquid crystals arranged in a certain arrangement. The phase retarder and the polarizer may further include a protective film.

In another embodiment, the optical functional layer may include a black matrix and color filters. The color filters may be arranged considering a color of light emitted from each of the pixels of the display device 1. Each of the color filters may include red, green, or blue pigment or dye. As another example, each of the color filters may further include quantum dots in addition to the pigment or dye described above. As another example, part of the color filters may not include the pigment or dye described above and may include scattering particles such as titanium oxide.

In another embodiment, the optical functional layer may include a destructive interference structure. The destructive interference structure may include a first reflective layer and a second reflective layer arranged on different layers. First reflected light and second reflected light reflected from the first reflective layer and the second reflective layer, respectively, may interfere destructively, and thus, reflectivity of external light may be reduced.

An adhesion member may be arranged between the touch electrode layer and the optical function layer. A general adhesion member known in the art may be employed without limitation. The adhesion member may include a pressure sensitive adhesive (PSA).

As described above, in embodiments, a belt, on which a base material may be seated, may be precisely adjusted by using a meandering prevention portion. Thus, an apparatus for manufacturing a display device having high reliability may be provided.

Also, a method of manufacturing a display device, whereby a polishing process having high reliability may be performed when the display device may be manufactured, may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, including any equivalents.

What is claimed is:

1. A method of manufacturing a display device, the method comprising:
    observing alignment marks disposed on a first surface of a belt that circulates;
    comparing positions of the alignment marks with preset positions; and
    adjusting a position of the belt by using a meandering prevention portion in accordance with a result of the comparing of the positions,
    wherein at least part of the meandering prevention portion faces a second surface of the belt, the second surface being a side surface of the belt.

2. The method of claim 1, wherein the adjusting of the position of the belt comprises moving the meandering prevention portion in a first direction to be in contact with the belt.

3. The method of claim 2, wherein the meandering prevention portion linearly moves the belt in the first direction.

4. The method of claim 1, wherein the meandering prevention portion is disposed in a region in which a moving direction of the belt changes.

5. The method of claim 1, wherein the meandering prevention portion comprises:
    a first roller of which at least a part faces the second surface; and
    a first spacing adjusting portion that moves the first roller.

6. The method of claim 1, wherein the observing of the alignment marks comprises removing a polish disposed on the alignment marks.

7. The method of claim 1, further comprising cleaning a surface of the belt.

8. The method of claim 1, further comprising pressing a third surface of the belt to maintain a tension of the belt, the third surface of the belt being opposite to the first surface of the belt.

9. The method of claim 1, further comprising:
    disposing a base material on the first surface; and
    polishing a surface of the base material by using a polishing head.

10. The method of claim 1, wherein the belt comprises an opening on which the base material is disposed.

* * * * *